F. R. BUTTON.
HOOF PAD.
APPLICATION FILED DEC. 31, 1917.
1,273,731.
Patented July 23, 1918.
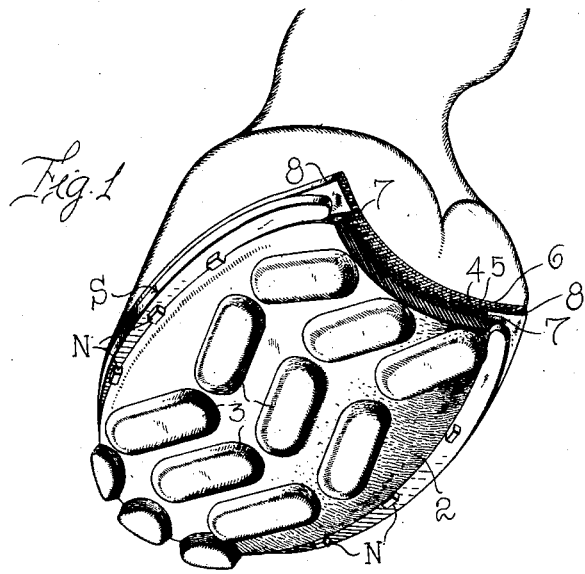
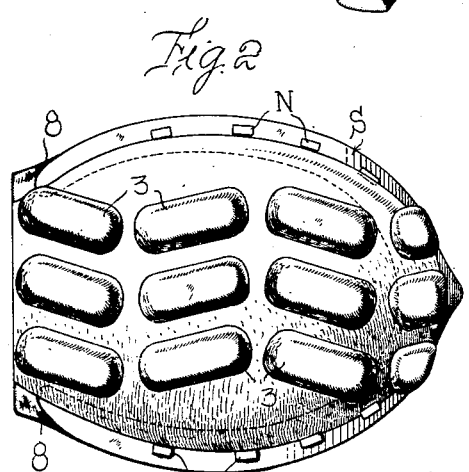
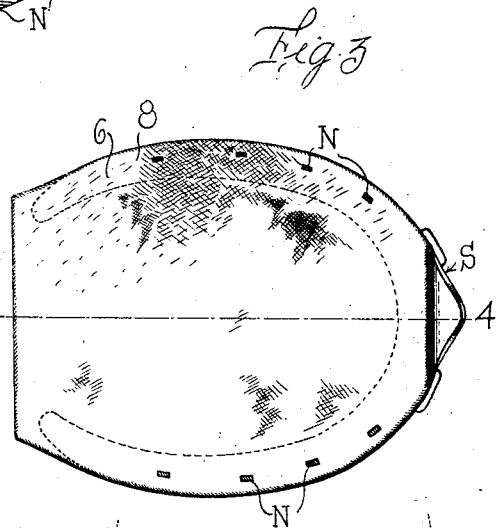
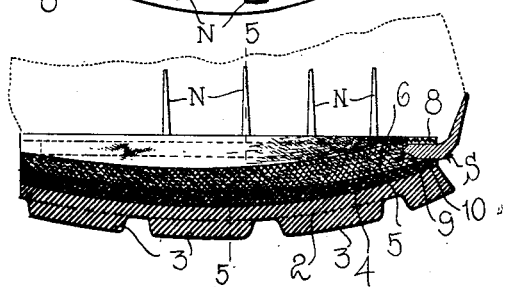
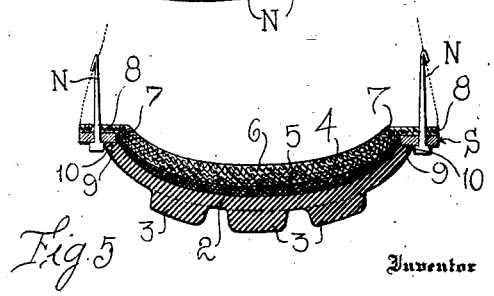
Inventor
FRANK R. BUTTON
Attorneys

UNITED STATES PATENT OFFICE.

FRANK R. BUTTON, OF SCRANTON, PENNSYLVANIA, ASSIGNOR OF ONE-HALF TO GEORGE W. DUNN, OF SCRANTON, PENNSYLVANIA.

HOOF-PAD.

1,273,731.  Specification of Letters Patent.  Patented July 23, 1918.

Application filed December 31, 1917. Serial No. 209,742.

*To all whom it may concern:*

Be it known that I, FRANK R. BUTTON, a citizen of the United States, residing at Scranton, in the county of Lackawanna and State of Pennsylvania, have invented certain new and useful Improvements in Hoof-Pads; and I do hereby declare the following to be a full, clear, and exact description of the invention, such as will enable others skilled in the art to which it appertains to make and use the same.

This invention relates to horseshoeing, and particularly to cushioned or padded shoes. It is one of the objects of the present invention to provide a cushioning or soft pad shoe especially for the purpose of relieving the soreness of horses' hoofs and ankles, and it is another object of the present invention to provide a novel arrangement of pad construction and the usual steel shoe, and also to provide an economical device and one which may be readily applied with the shoe to the horse's hoof. Another object of the invention is to provide a pad which can be readily made in any size, shape, and design of tread.

With these and other objects in view as will be more fully set forth in the following description, the invention consists of the construction, the combination, and the details and arrangement of parts more fully hereinafter described, one form of the invention being illustrated in the accompanying drawing, in which:

Figure 1 is an underneath perspective view of the device as applied to a horse's hoof.

Fig. 2 is an underneath plan view.

Fig. 3 is a top plan view.

Fig. 4 is a section on line 4—4 of Fig. 3.

Fig. 5 is a section on line 5—5 of Fig. 4.

The present invention is adapted for the utilization of the usual iron or steel horseshoe S which is applied to the horse's hoof in the usual manner by fastening nails N, the invention residing in the present instance in the provision of a cushioning pad which is in plan an outline approximately conforming to the plan outline of the shoe S, and as here shown, the pad consists of a traction bottom portion 2, preferably of rubber, and is provided with a series of projections or knobs 3 of suitable proportion and arrangement, and which are designed to take the wear when the device is in use. The lower tread portion 2 of the pad is vulcanized to an intermediate layer of rubber 4, which is preferably reinforced by fabric indicated at 5, and above this layer there is formed a vulcanized layer of canvas or other heavy fabric indicated at 8.

Preferably, the pad is built up and molded approximately as shown, so as to conform to the horseshoe, the canvas lining portion 6 being separated from the lateral portions 7 of the pad sufficient to overlap the top surface of the shoe, as at 8 in Figs. 4 and 5, and the lateral edges of the pad being grooved or indented as at 9—9 to receive the side members of the horseshoe, beneath which are projected as at 10—10 the lips formed by the undersetting or marginal recessing of the sides of the pad beneath the side edges of the fabric lining 6. In this manner the lower surface of the shoe S is substantially covered by the projecting side, recessed portion of the pad, and the top of the shoe is overlapped by the lateral, extending edges, so that when the shoe is applied with the pad to a horse's hoof as shown in Fig. 1, the nails N are driven through the nail holes, which are exposed at the lateral sides of the pad, and passing through the shoe, they penetrate the extending lips of the canvas lining 8, and the pad and shoe are securely fastened to the hoof.

In this manner, I am able to readily and inexpensively provide an effective cushioning pad which is substantially concavo-convex in transverse and longitudinal sections, the concave side of the pad being disposed uppermost and therefore beneath the softer portions of the horse's hoof, and the lower convex side of the pad is directed downwardly, and takes the wear which is usual to the shoe construction, and thus protects the central portion of the horse's hoof from contact and wear. The pad thus lies in the form of an inverted arch, and is set in compression by the load of the horse's hoof and limb when applied. The resilient nature of the article tends to yieldingly support the horse's hoof, and not only relieves the latter from injury and shock, but also by provision of the knobby surface, tends to prevent the animal from slipping or skidding.

Having described my invention, what I claim and desire to secure by Letters Patent is:

A pad for horses' hoofs and shoes consisting of a lower rubber tread portion substantially co-extensive with the area inscribed by the shoe in plan and having an upper composite rubber and woven fabric top also coextensive with the area of the figure of the shoe, the sides of the pad undercut so that the fabric overhangs the shoe, the pad being concavo-convex and having the medial longitudinal portion of the convex tread surface provided with relatively thick anti-skidding projections.

In testimony whereof I affix my signature.

FRANK R. BUTTON.

Copies of this patent may be obtained for five cents each, by addressing the "Commissioner of Patents, Washington, D. C."